Jan. 22, 1952 J. DÜRLER 2,583,477
ROTARY TOOL CARRIER FOR CUTTING TOOLS
Filed July 27, 1949 4 Sheets-Sheet 1

INVENTOR:
JACQUES DÜRLER
BY
ATTORNEY

Jan. 22, 1952     J. DÜRLER     2,583,477
ROTARY TOOL CARRIER FOR CUTTING TOOLS

Filed July 27, 1949     4 Sheets-Sheet 2

INVENTOR:
JACQUES DÜRLER
BY
ATTORNEY

Jan. 22, 1952 J. DÜRLER 2,583,477
ROTARY TOOL CARRIER FOR CUTTING TOOLS
Filed July 27, 1949 4 Sheets-Sheet 4

INVENTOR:
JACQUES DÜRLER
BY

ATTORNEY

Patented Jan. 22, 1952

2,583,477

UNITED STATES PATENT OFFICE 2,583,477

ROTARY TOOL CARRIER FOR CUTTING TOOLS

Jacques Dürler, Geneva, Switzerland, assignor to Societe Genevoise d'Instruments de Physique, Geneva, Switzerland, a firm of Switzerland Application July 27, 1949, Serial No. 107,122
In Switzerland August 11, 1948

3 Claims. (Cl. 82—1)

There exist different types of tool carriers for machining, in which a radial movement of advance can be given to the cutting tool during the rotation of the spindle in order to effect planing work. In certain types, this movement of advance is effected by a hand-operated mechanism; on the other hand, in others it is automatically effected by the rotation of the spindle, the latter system being preferable to the first since it ensures a more uniform progressive advance of the cutting tool.

The disadvantages of the known constructions are those of having too restricted a travel of the cutting tool and of giving merely one value of the advance per revolution of spindle, thus limiting very much the possibilities of use. There is often experienced very insufficient rigidity of the tool-carrier unit, entailing chattering of the cutting tool which is more and more pronounced as the latter recedes from the axis of the spindle, which chattering is very prejudicial to the obtainment of a flat surface of good quality.

The present invention, which remedies these deficiencies, relates to a rotary tool-carrier for a cutting tool, with automatic radial advances of the cutting tool, comprising a body intended to be fixed to the rotary spindle of a machine tool and in which a tool-carrying slider can be displaced. This rotary tool-carrier is characterized by a main ring which is capable of turning on this body and the inner surface of which, eccentric with respect to the said body, co-operates with friction rollers borne by two diametrically opposite arms of a central movable frame mounted in the body, this frame carrying at least two pawls acting upon a toothed wheel which is rigid with a controlling member which has, facing the slider hereinbefore mentioned, a conical surface in which is cut a spiral-shaped groove engaging with a rack on this slider in such a manner that, the main ring being immobilised, the rotation of the tool-carrier communicates to the cutting tool an automatic advance movement of a value which is variable according to the number of pawls in mesh with the toothed wheel.

The accompanying drawing shows, by way of example, one form of construction of the object of the invention.

Figures 1, 2:
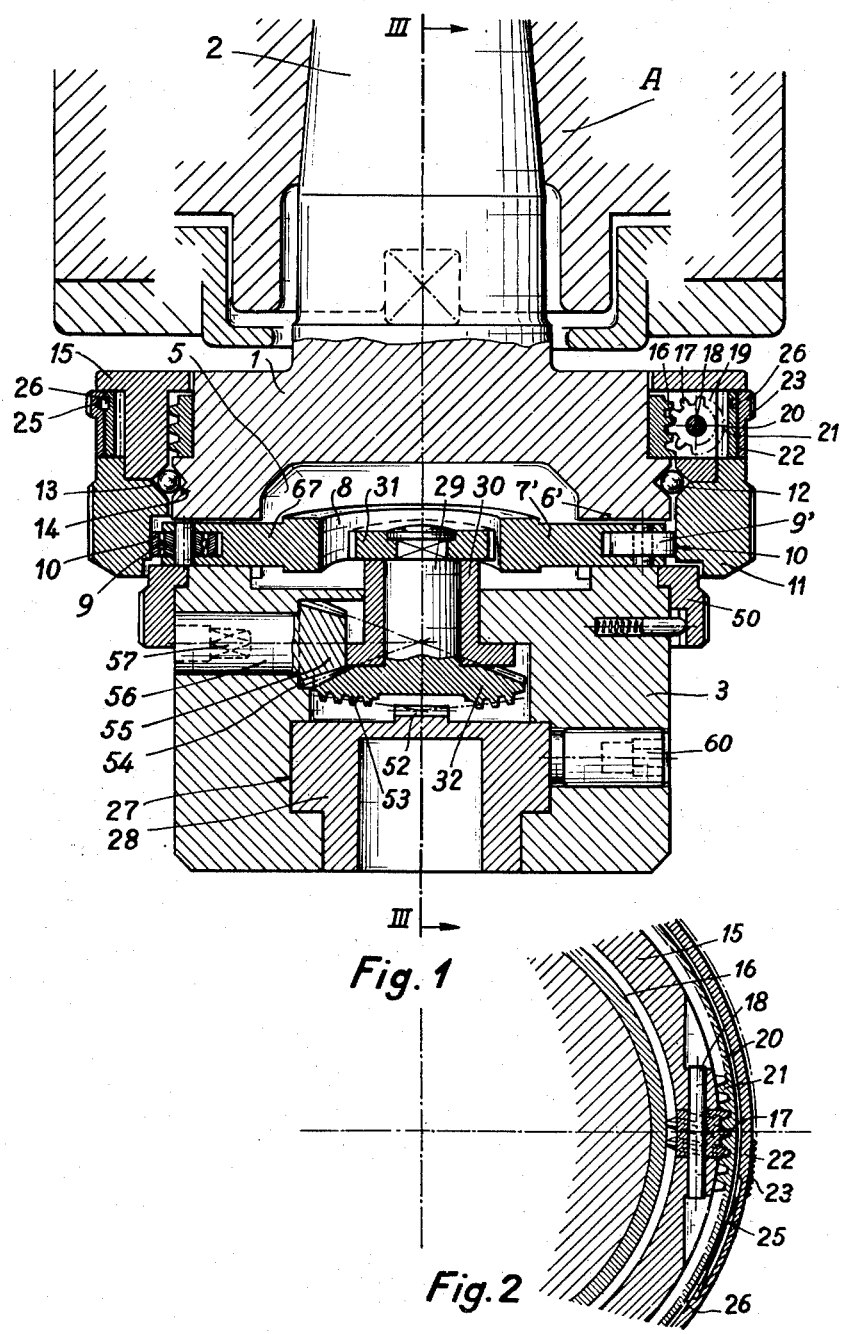
Fig. 1 is a section in elevation, Fig. 2 of which is a detail.
Figure 3:
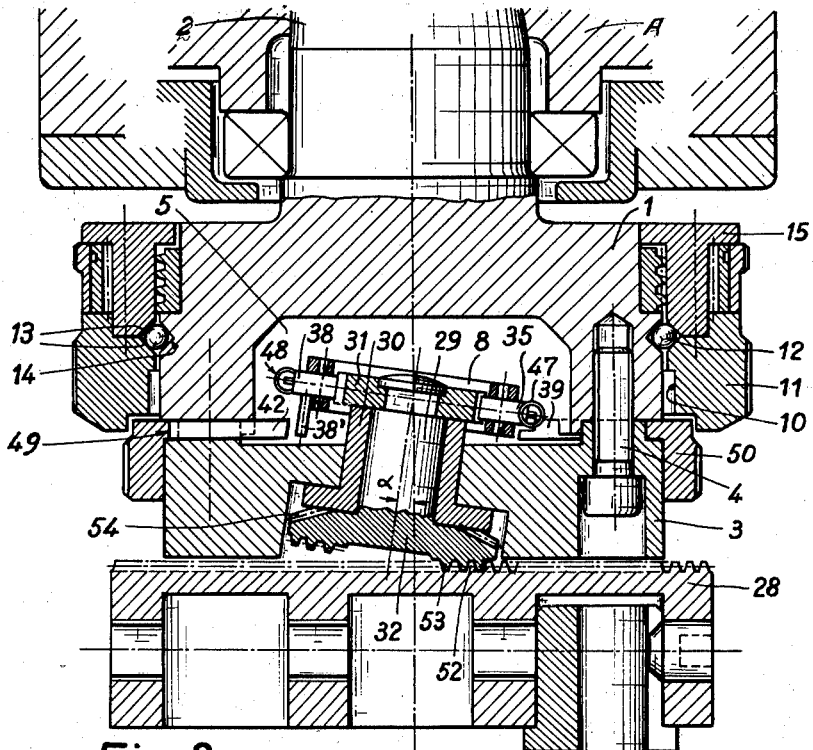
Fig. 3 is a section in elevation along III—III of Fig. 1.
Figure 4:
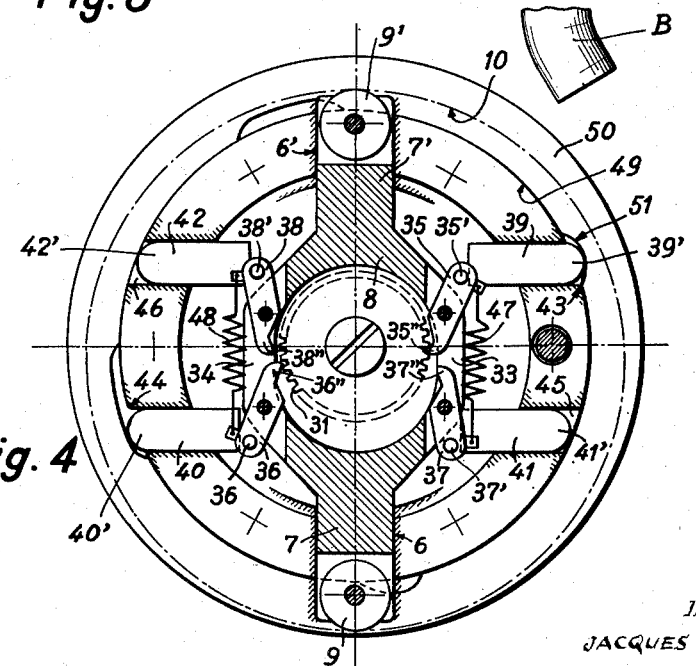
Fig. 4 is a plan section of Fig. 3.

The body of the tool-carrier is constituted by an upper portion 1 with helving cone 2 and a lower portion 3 rigidly fixed to the upper portion 1 by screws 4; the cone is fixed in the rotary spindle A of a machine tool. The upper portion 1 comprises at the centre a recess 5 for housing a portion of the mechanism for driving the cutting tool B, and two diametrally opposed grooves 6 and 6′ serving to guide the arms 7 and 7′ of a central movable frame 8.

At the end of the arms 7 and 7′ are loosely mounted friction rollers 9 and 9′ which roll on the inner surface 10 of a main ring 11 surrounding the body and eccentric with respect to this body; these friction rollers impart to the frame 6 an alternate movement of translation when the main ring 11 does not participate in the rotary movements of the body. The main ring 11 is axially supported and radially guided by a train of balls 12 rolling in grooves 13 and 14 provided for this purpose. After mounting the train of balls 12, the annulus 15 is rigidly fixed by screws to the ring 11.

Figure 6:
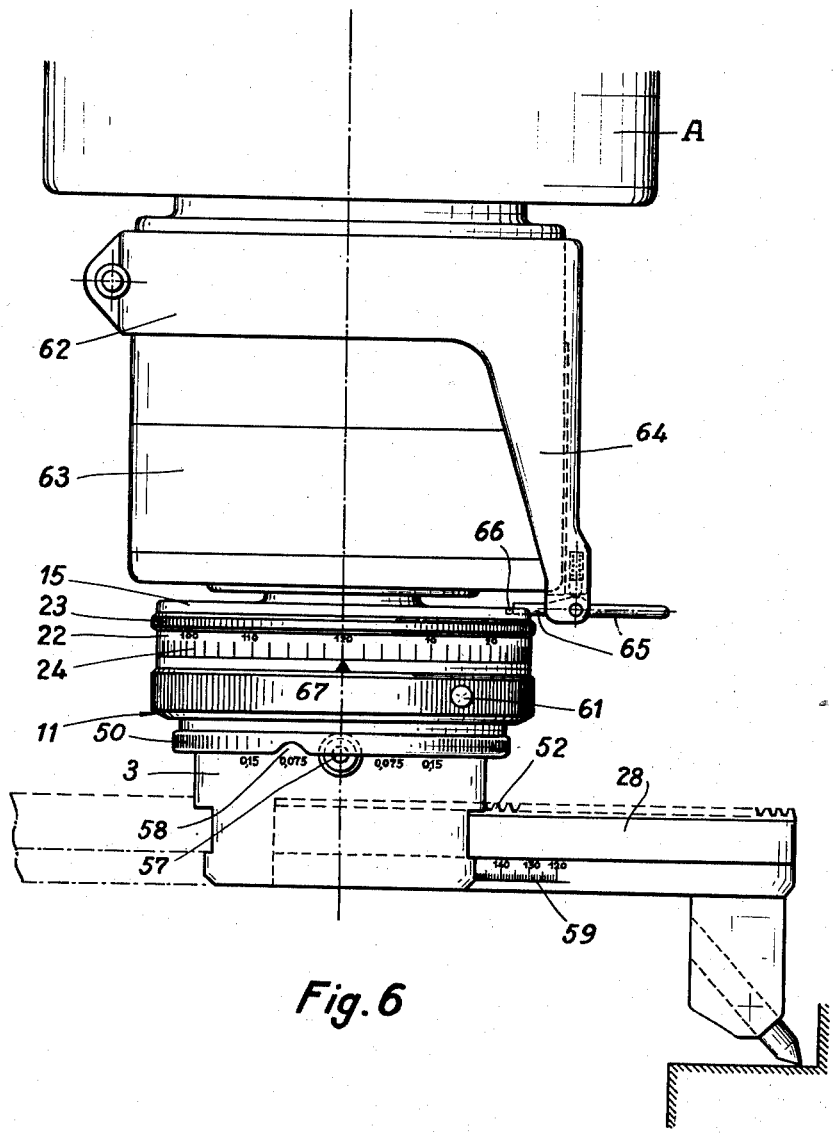
Fig. 6 is an elevation of the whole.

A worm 16 rigid with the upper portion 1 engages with a pinion 17 loosely mounted on its spindle 18 in a housing 19 of the annulus 15. This pinion has a double cut parallel to its axis and as a worm (Fig. 2) in order to drive by its rotation a ring 20 with straight internal toothing 21. An outer ring 22, concentric with the ring 20, carries on its periphery a knurling 23 and a graduation 24 (Fig. 6). Springs 25 housed in internal milled portions of the ring 20 and effect a slight frictional association between the rings 20 and 22.

In the lower portion 3 of the body of the tool-carrier, there is provided from side to side a slideway 27, the axis of which is perpendicular to the axis of the arms 7 and 7′, this slideway serving to guide the tool-carrying slider 28. A shaft 29 inclined at an angle to the axis of the tool-carrier in the vertical plane passing through the axis of the slider 28, and turning in a thimble 30 fixed in the lower portion 3 of the body of the tool-carrier, carries at one end the toothed wheel 31 and at the other end a driving member 32 having a conical face facing the slider 28, a spiral-shaped groove 53 being cut in this face.

Pawls 35, 36, 37 and 38 pivoted in housings 33 and 34 of the central frame 8, the plane of which is perpendicular to the shaft 29. Thrust members 39, 40, 41 and 42, guided in grooves 43, 44, 45 and 46 of the lower portion 3 of the body of the tool-carrier, limit, through the medium of pins 35' to 38', the angular position of the pawls 35 to 38, the beaks 35" to 38" of which, under the action of the springs 47 and 48, tend to engage in the teeth of the wheel 31. The ends 39' to 42' of the thrust members are in contact with a circular cam 49 constituted by the inner surface of the knurled ring 50. The latter is manually adjustable in different angular positions and is kept fixed in each position by an arresting device not represented.

Figure 5:
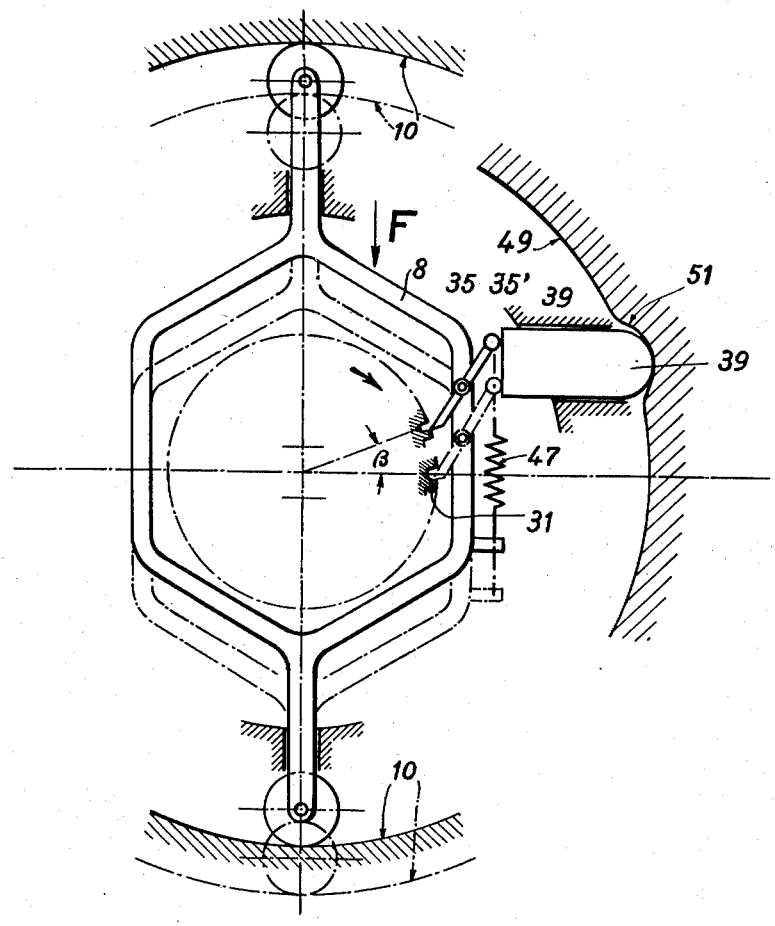
Fig. 5 is a diagram showing the functioning of a detail.

In one of these positions (Fig. 5), the thrust member 39 is found to be opposite to a notch 51 of the cam 49, which notch it can enter when releasing the pawl 35, which pivots under the action of the spring 47 and penetrates into the toothing of the wheel 31. Each movement of the frame 8 in the direction of the arrow F will then turn the wheel 31 through an angle B, function of the eccentricity of the surface 10.

This eccentricity will, in general, be so chosen that each thrust of the pawl, that is to say each revolution of the tool-carrier, turns the wheel 31 by the amount of one tooth. If, for another position of the ring 50, there are two pawls in action, 35 and 36 for example, with the toothed wheel 31, the latter will turn by the amount of one tooth at each half-revolution of the tool-carrier.

If, instead of the pawls 35 and 36, it is the opposite pawls 37 and 38, or merely one of the two, that cooperate with the wheel 31, the rotation of the latter will be effected in the opposite direction.

The slider 28 carrying the cutting tool comprises on its upper face a rack 52 in mesh with the spiral groove 53 of the driving member 32 which is rigid with the shaft 29 and the wheel 31.

The angle a which the axis 29 forms with the axis of the tool-carrier is chosen in such a manner that the portion of the toothing 53 of the driving member 32 opposite to that portion which is in engagement with the rack does not come into contact with the latter.

The automatic advance of the cutting tool per revolution of the spindle will be determined by the pitch of the rack 52 and of the spiral-shaped groove 53, by the number of teeth of the wheel 31 and by the number of pawls in action. It will be possible, for instance, to choose those elements so that, when working with one single pawl, the advance of the cutting tool per revolution of the spindle may be 0.075 millimetre, while it would be 0.150 millimetre when working with two pawls.

On the back of the driving member 32 is provided a toothing 54 engaging with a bevel pinion 55 cut at the end of a shaft 56 and comprising at its other end a housing 57 for an operating key. The ring 50, which partly hides this housing, comprises on its periphery a notch 58 enabling the operating key to be introduced into the housing 57 in a well defined angular position of the ring 50 with respect to the body of the tool-carrier. In this position, the cam 49 acts simultaneously on the four thrust members 39 to 42 so as to release the four pawls 35 to 38 from the toothed wheel 31. The latter, liberated from its driving mechanism, then enables the distance from the cutting tool to the axis of rotation to be quickly adjusted with the operating key. This distance is reference-marked by a graduation 59 on the side of the slider 28.

When it is desired to utilise the tool-carrier for boring work, the slider 28 is locked in the desired position by a known means, a set screw 60 for example, and the ring 11 is allowed to turn with the body of the tool-carrier.

On the other hand, for planning work the setscrew 60 is unlocked. The ring 50 is adjusted in the position corresponding to the direction and magnitude of the advance desired, and the main ring 11 is kept fixed manually by a rod (not represented) penetrating into the hole 61. In order to arrest the main ring 11, it is also possible to provide a mechanical device pressing upon a fixed portion, for instance the guide of the spindle.

Fig. 6 shows a device of this kind comprising a collar 62 fastening on the guide 63 of the spindle and a right-angled arm 64, at the end of which is pivoted a small lever 65, one of the arms of which engages into a corresponding notch 66 of the annulus 15 that is rigid with the ring 11. This lever can be released from the notch by pressing upon the other arm, an arresting means not represented being provided in order to immobilise it in one position or the other.

The gears 16, 17 and 21 constituting a speed reducer, the tool carrier when turning will produce rotation, at reduced speed, of the rings 20 and 22. On the main ring, which is kept fixed, is an index 67, opposite to which the graduation 24 of the ring 22 slowly moves. The gears for driving the ring 22 and the graduation 24 are combined in order that the latter, previously put to zero facing the index 67, may indicate at any instant the advance effected by the cutting tool, which advance is proportional to the number of revolutions of the tool-carrier.

What I claim is:

1. In a rotary tool-carrier for cutting tool, with automatic radial advance of the latter, comprising a body intended to be fixed to the rotary spindle of a machine tool, a main ring capable of turning on this body and a radially movable slider carrying the cutting tool and provided with a rack; a driving member for this slider provided with a disc shaped head one face of which, facing said rack, is conical and is provided with a spiral shaped groove engaging with said rack, the axis of said driving member being inclined with respect to the axis of the tool-carrier from such an angle that a generating line of said cone is parallel to said rack, and a connecting device between said main ring and said driving member, the whole in such a way that the rotation of said driving member produces the displacements of said slider.

2. In a rotary tool-carrier for cutting tool, with automatic radial advance of the latter, comprising a body intended to be fixed to the rotary spindle of a machine tool, a main ring capable of turning on this body and a radially movable slider carrying the cutting tool and provided with a rack; a driving member for this slider provided with a disc shaped head one face of which, facing said rack, is conical and is provided with a spiral shaped groove engaging with said rack, the axis of said driving member being inclined with respect to the axis of the tool-carrier from such an angle that a generating line of said cone is parallel to said rack, a toothed wheel secured to said driving member, driving pawls engaging said wheel, a frame surrounding said wheel, situated in a plane perpendicular to the axis of said driving member and on which said pawls are articulated, two arms diametrically opposed on said frame, two slides in said body for guiding said arms, rollers on said arms, and an eccentric inner surface in said main ring on which bear said rollers, the whole in such a way that, when said main ring is immobilized, the rotation of the tool-carrier communicates to the frame an alternative movement which drives, by the intermediary of the pawls, the driving member at a speed variable according to the number of pawls engaging said wheel.

3. In a rotary tool-carrier for cutting tool as claimed in claim 2, a second ring the inner face of which has the form of a cam and pushers cooperating with said cam for putting separately said pawls into engagement with said toothed wheel.

JACQUES DÜRLER.

REFERENCES CITED

The following references are of record in the file of this patent:

UNITED STATES PATENTS

| Number | Name | Date |
|---|---|---|
| 1,834,716 | Kis | Dec. 1, 1931 |
| 1,962,951 | Conwell | June 12, 1934 |
| 2,151,251 | Weidner | Mar. 21, 1939 |
| 2,209,867 | Wohlhaupter | July 30, 1940 |
| 2,489,719 | Meyers | Nov. 29, 1949 |